United States Patent [19]
Kurita et al.

[11] 3,948,097
[45] Apr. 6, 1976

[54] FLOW VELOCITY MEASURING DEVICE

[75] Inventors: Yoshio Kurita; Katsumi Takahashi; Toshio Aga, all of Musashino, Japan

[73] Assignee: Yokogawa Electric Works, Ltd., Tokyo, Japan

[22] Filed: Aug. 26, 1974

[21] Appl. No.: 500,451

[30] Foreign Application Priority Data
Aug. 28, 1973 Japan.............................. 48-96435

[52] U.S. Cl............................................ 73/194 VS
[51] Int. Cl.² ........................................ G01F 1/32
[58] Field of Search .......................... 73/194 B

[56] References Cited
UNITED STATES PATENTS

| | | | |
|---|---|---|---|
| 3,722,273 | 3/1973 | Yamasaki et al. | 73/194 |
| 3,732,731 | 5/1973 | Fussell | 73/194 |
| 3,810,388 | 5/1974 | Cousins et al. | 73/194 |

*Primary Examiner*—Herbert Goldstein
*Attorney, Agent, or Firm*—Parmelee, Johnson & Bollinger

[57] ABSTRACT

A flow metering apparatus of the type having a vortex generating element with a generally elongate cylindrical shape placed in a stream of flowing fluid so as to produce Karman's vortices at a rate proportional to the velocity of the flowing fluid, with means for detecting the rate of production of vortices to give a linearly related measure of fluid velocity. To improve the correspondence of vortex production rate with flow velocity over wide conditions of flow, the element is formed with a rectangular cross-section in which the depth $d$ along the direction of flow and the height $h$ across the direction of flow are arranged in a ratio $d/h$ of between about 0.5 and 0.9 and preferably in a ratio of 2/3. In the vortex generating element, passageway means extend between openings in the two opposed rectangle sides which are aligned with the direction of flow. The passageway means communicate fluid fluctuations past a flow detector to measure the frequency of vortex production and thereby determine the velocity of the fluid stream. Further improvement of the correspondence of vortex production rate with flow velocity is attained by dimensioning the area A of the passageway opening in relation to the area Ao of the rectangle side containing the opening so that $0.3 \leq A/Ao < 1$. The length $l$ of the passageway opening in the axial direction of the vortex generating element is related to the inside diameter D of the pipe in which the element is placed so that $0.5 \leq l/D < 1$. Finally, the rectangle height $h$ is related to the inside diameter $D$ of the pipe so that $0.2 \leq h/D \leq 0.35$.

9 Claims, 23 Drawing Figures

FLOW VELOCITY MEASURING DEVICE

BACKGROUND OF THE INVENTION

1. Field of the Invention

This invention relates to flow-velocity measuring apparatus of the type wherein a cylindrical object in a stream of flowing fluid produces a wake including a distinct pattern of vortices known as the Karman vortex street. The vortices are shed alternately from opposite sides of the object in a periodic manner. There is a definite relationship between the frequency $f$ of shedding of the vortices, the velocity V of the stream, and the height $h$ of the object in the direction transverse to the direction of the flowing fluid, expressed by:

$$f = KV/h$$

where $K$ is a constant for flow within a range of velocities. Accordingly, within this range, it is possible to easily determine the flow velocity $V$ by measuring the frequency $f$ of the generation of vortices.

Description of the Prior Art

It has been found that the desired linear relationship between flow-velocity $V$ and frequency $f$ of the vortex generation does not apply over the full range of conditions encountered in flow measurement. When a cylindrical object is immersed in a stream of fluid flowing through a pipe and particularly when flow velocity increases beyond a certain point, $k$ is not a constant and the measurement of vortex production does not simply yield a measurement of velocity. Though the causes of this disparity may not have yet been completely explained, it is believed to result from the uneven velocity distribution of a fluid flowing through a pipe, from the fluctuation and eddies other than Karman vortices which develop in the flowing fluid, and from changes in the separating point of the boundary layer of the fluid flowing along the object surface as the flow velocity increases.

Various arrangements have been proposed for generating Karman vortices more stably in a flow measurement environment. In one such type of arrangement disclosed in U.S. Pat. No. 3,564,915 to Miyaji Tomota, et al., and in U.S. patent application Ser. No. 348,121 filed Apr. 5, 1973, by Hiroo Yamasaki, et al., a cylindrical element is formed with a transverse bore or slit intercepting the cylinder surface in the regions where boundary layer separation normally occurs, with fluid flow alternating through the transverse bore or slit as the Karman vortices are generated and assisting in causing or retarding bondary layer separation for more reliable vortex production without influence from eddies and other fluid fluctuations.

In another prior art arrangement disclosed in U.S. Pat. No. 3,693,438 to Hiroo Yamasaki et al., a cylindrical element is formed with recessed surface portions to control boundary layer separation for more reliable vortex production.

In another prior art arrangement disclosed in U.S. Pat. no. 3,116,639 to Bird, a cylindrical object is formed with a cross-sectional shape which reduces flow resistance at high speeds, and avoids deleterious effects on vortex production caused by cavitation, such shapes including a streamlined fore-part (such as a semi-ellipse) with the after part cut away and recessed.

Apparatus of the general type referred to above has not been fully satisfactory in all conditions and fluid velocity measurement applications in providing a linear relationship between flow velocity $V$ and the frequency $f$ of vortex generation. While gains have been made in improving stability of vortex production, difficulty in attaining linearity at very high velocities of flow persists.

SUMMARY OF THE INVENTION

It is a principal object of this invention to provide improved flow-velocity measuring apparatus of the type sensing the shedding of Karman's vortices and thereby measuring the velocity of fluid flow. It is a specific object of the invention to provide a flow-velocity measuring apparatus which extends the range of flow velocity for which a linear relationship exists between flow velocity and frequency of vortex generation. Still another object of the invention is to provide a flow-velocity measuring apparatus of the type described which is more suitable for commercial use.

In a preferred embodiment of the invention to be described hereinbelow in detail, the cylindrical object inserted in the flowing stream to generate Karman's vortices is formed with a rectangular cross-section arranged with its depth $d$, along the direction of fluid flow, and its height $h$, transverse to the direction of fluid flow, in a ratio of $d/h$ of between about 0.5 and 0.9, and preferably in a ratio of 2/3. In further aspects of the invention, the vortex generation element is mounted within a pipe of inner diameter $D$ and is arranged with the ratio $h/D$ between about 0.2 and 0.35; the vortex generating element has passageway means for communicating fluid fluctuations between the rectangle sides aligned with the direction of fluid flow and forming of openings in said sides; the area $A$ of the passageway opening is related to the area $Ao$ of the rectangle side containing the opening with a ratio $A/Ao$ of between about 0.3 and 1.0; and the length $l$ of the opening, measured in the axial direction of the vortex generating element, is related to the pipe inner diameter $D$ with a ratio $l/D$ of between about 0.5 and 1.0. These arrangements afford linearity of operation extending over a broad range, and are also advantageous in that they allow a transverse bore arrangement to further assist in the production and detection of Karman's vortices.

Other objects, aspects and advantages of the invention will be pointed out in, or apparent from, the detailed description hereinbelow, considered together with the following drawings.

DESCRIPTION OF THE DRAWINGS

FIG. 7 is a cross-sectional view taken on line VIB—VIB of FIG. 6A;

FIG. 7A is a sectional view along the axis of the pipe and across the vortex generating element;

FIG. 7B is a sectional view on line VIIB—VIIB of FIG. 7A; and

FIG. 7C is a sectional view on line VIIC—VIIC of FIG. 7B; and

FIGS. 8A, 8B through 13A, 13B illustrate other embodiments of the invention, FIGS. 8A, 9A–13A showing sectional side views, and 8B, 9B–13B showing sectional views taken on lines VIIIB—VIIIB, IXB—IXB, . . . XIIIB—XIIIB respectively.

DESCRIPTION OF THE PREFERRED EMBODIMENT

Figure 1:
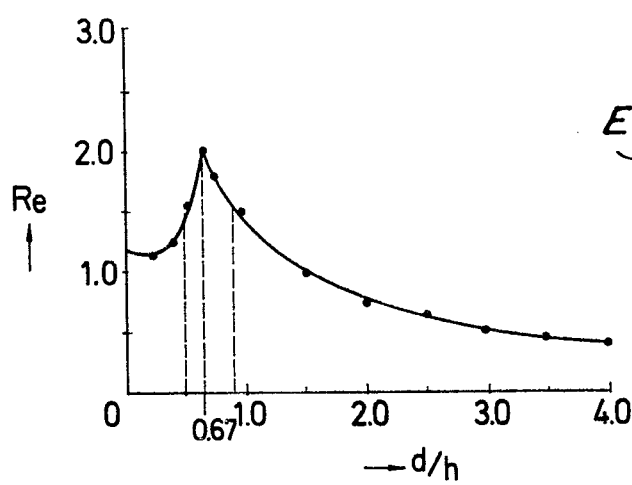
FIG. 1 is a graph showing the drag or resistance Re of a cylindrical object immersed in a stream of flowing fluid as a function of the depth to height ratio $d/h$ of the cylindrical object's cross-section.
Figure 2:
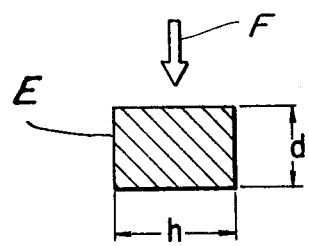
FIG. 2 is a cross-sectional view of the cylindrical object showing measurement of the depth and height of its rectangular cross-section.

FIG. 1 shows the result of experiments conducted by the inventors herein to determine the drag or flow resistance Re of a cylindrical vortex generating element E having a rectangular cross-section as shown in FIG. 2, for different ratios of depth $d$ and height $h$ for the rectangle (where, as shown in FIG. 2, depth $d$ is measured as the dimension of a rectangle side extending along the flow direction, shown by arrow F, and height $h$ is measured across the flow direction).

According to the graph of experimental results appearing as FIG. 1, it may be recognized that when the ratio of two sides of the rectangle $d/h$ is within a range of 0.5 to 0.9, especially in the vicinity of 0.67 ($d/h = 2/3$), the resistance Re developed by the vortex generating element E shows a sudden increase.

Although the phenomenon of a sudden increase of aerodynamic drag of a rectangle cylinder at a $d/h$ ratio of 2/3 has previously been experimentally determined (see H. Nakaguchi et al., "An Experimental Study on Aerodynamic Drag of Rectangular Cylinders", published in Journal of Japan Aeronautics Association, vol. 16, No. 168, January, 1968), the theoretical reasons for such phenomena have not sufficiently been made clear to date, nor has it been discovered that such phenomena have practical value in flow-velocity measuring.

Figure 3A:
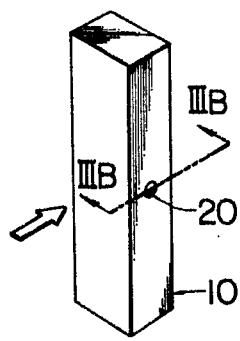
FIG. 3A is a perspective view of a vortex generating element constructed according to the present invention.
Figure 3B:
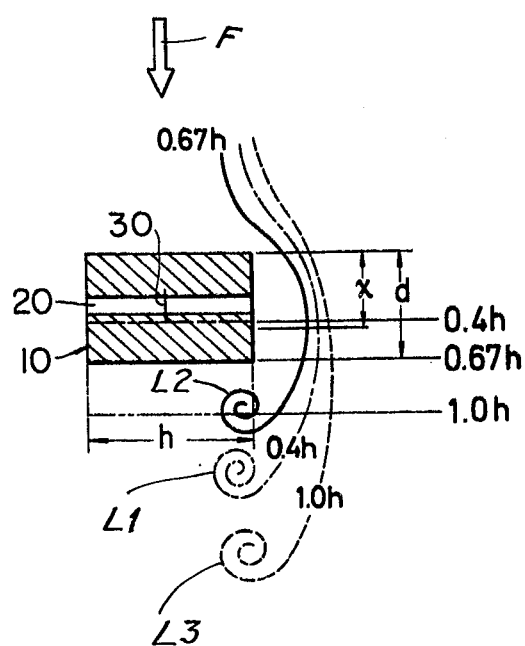
FIG. 3B is a section on line IIIB—IIIB of FIG. 3A.

FIGS. 3A and 3B illustrate a cylindrical vortex generation element 10 having a rectangular cross-section with a $d/h$ ratio of 0.67 and also having, on the two opposite sides thereon extending along the direction of flow F, two openings communicating with each other through a transverse passageway or bore 20. Within bore 20 a detecting means 30 sensitive to fluid displacement, such as a hot wire, is arranged.

The three curved lines L1, L2 and L3 shown in FIG. 3B represent conditions of flow around the vortex generating element 10 when the $d/h$ ratios of the element 10 inserted in the flowing fluid are 0.4, 0.67 and 1.0 respectively. When the $d/h$ ratio is 0.67, the flowing fluid, as shown by line L2, is separated most powerfully from the upstream surface of the element 10 away from the direction of flow F at both edges of element 10, and the flow around the edges is the most strongly accelerated and then is most quickly engulfed behind element 10.

Figure 4:
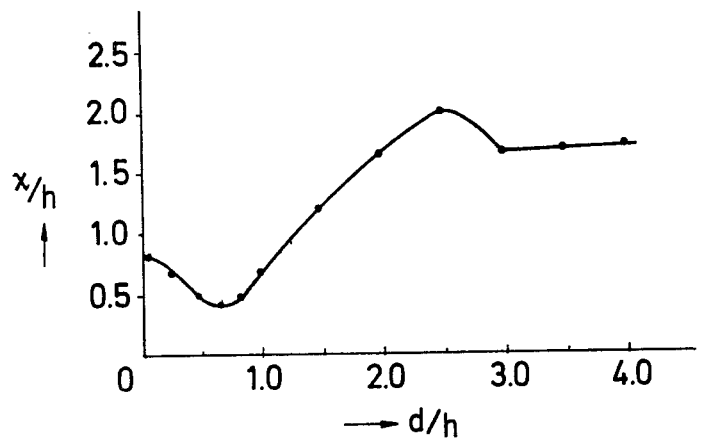
FIG. 4 is a graph indicating the dependence upon depth to height ratio $d/h$ of a distance $x$ between the point where flow is separated from the vortex generation element to the point where the flow begins to coil up for generating a vortex.

FIG. 4 is a graph showing the dependence upon changes in the $d/h$ ratio of a distance $x$, measured from the front edge of the element 10 to the point where the flow begins to turn back toward element 10 and coil up for generating a vortex. As shown in FIG. 4, it is clear that when the $d/h$ ratio is in the vicinity of 0.67, the coiling-up of flow lines is started at the shortest distance $x$ (approximately 0.4h) from the element front edge and a vortex is completed at the closest point to the vortex generating object 10. Accordingly, when vortex generating element 10 is formed with a rectangular cross-section and the depth to height ratio $d/h$ has a value of about 0.67, the flow around the vortex generating element is strongly accelerated and an immediate coiling-up of the flow takes place: that is, flow energy is converted efficiently into vortex energy, which is believed to generate more powerful Karman's vortices and act to stabilize the shedding of the vortices, even where the flow velocity of a fluid to be measured is comparatively low.

Unlike a circular cylinder, a rectangular cylinder has distinct edges, and the separating point of flow is fixed at one of said edges, which is thought to result in an improvement of the linearity of output signals of the vortices generated.

As vortices are generated, pressure variations are imposed alternatingly upon opposite ends of the fluid which fills the transverse bore 20, and an alternating displacement of the fluid occurs. The detecting means 30 which is arranged in the transverse bore 20 will detect displacement of the fluid and thereby measure the rate of vortex production and the corresponding velocity of fluid flow.

Figure 5:
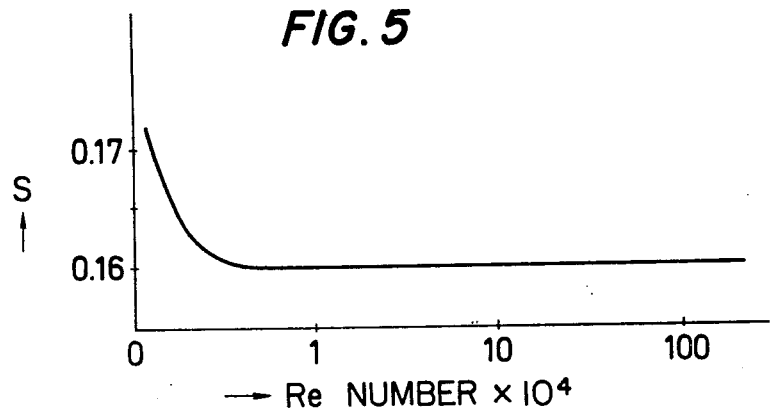
FIG. 5 is a graph showing results of experiments made on devices constructed according to this invention to determine linearity of response.

FIG. 5 is a graph showing the results of an experiment made to determine linearity of measurement. The graph shows the relationship between the Reynolds number Re (Re $= hV/\nu$, where $V$ is the flow velocity of a fluid to be measured and $\nu$ is the dynamic viscosity coefficient) and the Strouhal number S ($S = hF/V$, where $f$ is the number of vortices generated during a unit time). As shown by the graph, a very satisfactory result of the use of a vortex generating element 10 as described is that the measuring range may be expanded until the Reynolds number becomes nearly 3000.

Figure 6A:
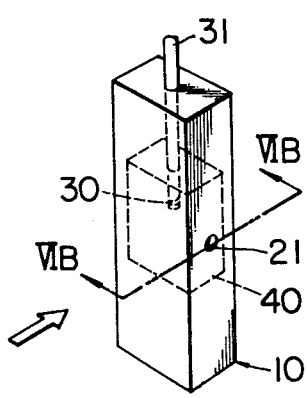
FIG. 6A is a perspective view illustrating another embodiment of the invention.
Figure 6B:
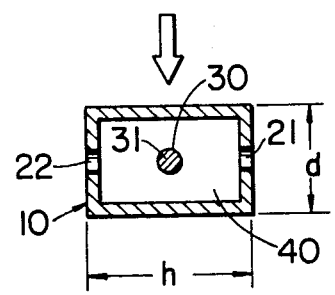

FIGS. 6A and 6B illustrate a Karman's vortex generating element 10A having a rectangular cross-section as described, and an interior cavity 40 communicating with opposite surfaces of element 10A through transverse bores 21, 22. A fluid displacement detecting element 30 is arranged in the interior of cavity 40 at the tip of a rod 31 which is arranged to be removable for the purpose of examining or repairing the detecting element 30.

In an additional aspect of the present invention, it was determined how the Karman vortex generation is affected by the shape, size and/or volume of the openings of transverse bores provided on opposite sides of the Karman vortex generating element. As a result, it has been found that vortex generation is influenced by the side-surface area of a vortex generating element, the shape and size of the opening of a transverse bore, and the pipe gauge wherein said vortex generating element is installed. Experimental determinations show that:

1. When $0.3 \leq A/A_o < 1$, where $A$ is the area of an opening of a transverse bore formed in a surface of the vortex generating element, and $Ao$ is the area of the rectangular side of the vortex generating element which contains the opening, then the Strouhal number $St$ becomes constant regardless of little changes in $Ao$ caused by deposit of contaminations or the like.

2. When $0.5 \leq l/D < 1$, where $l$ is the length of a transverse bore opening in the axial direction of a vortex generating element; and $D$ is the inside diameter of a pipe in which said vortex generating element is installed, the Strouhal number $St$ becomes constant and linearity of the relationship between flow velocity and frequency of vortex generation is improved remarkably regardless of variations of flow-velocity distribution, etc.

3. When $0.2 \leq h/D \leq 0.35$ where $h$ is the height of the vortex generating element as previously defined, and $D$ is the inside diameter of a pipe in which said vortex generating element is installed, a far more powerful and stable vortex may be generated. If $h$ is too small in comparison with $D$, however, vortices produced are small and flow inside a transverse bore also become weak. On the contrary, if $h$ is too large in comparison with $D$, it becomes impossible to shed stable vortices because of the influence of the pipe-wall.

Accordingly, if a vortex generating element satisfies the conditions stated below, very powerful and stable vortices may be generated and it becomes possible to realize an apparatus capable of measuring flow velocities accurately and within a broad measuring range from low velocities to high velocities:

1. The vortex generating element has a rectangular cross-section and the ratio $d/h$ is within 0.5 to 0.9.

2. On opposite sides of the vortex generating element the openings of a transverse bore or passageway are arranged to communicate with each other through the element and the ratios of $A/Ao$ and $l/D$ as defined above are within the following ranges:

$$0.3 \leq A/Ao < 1$$

$$0.5 \leq l/D < 1$$

Figure 7A:
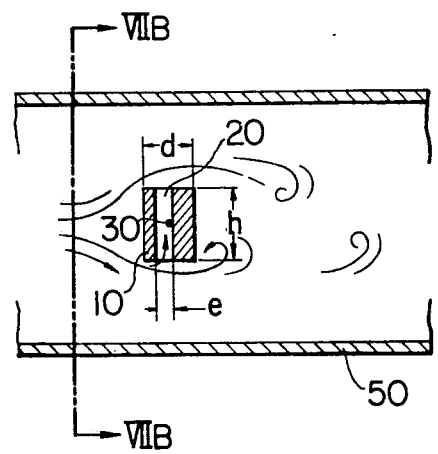
FIGS. 7A, 7B and 7C illustrate still another embodiment of the invention, installed in a pipe.
Figure 7B:
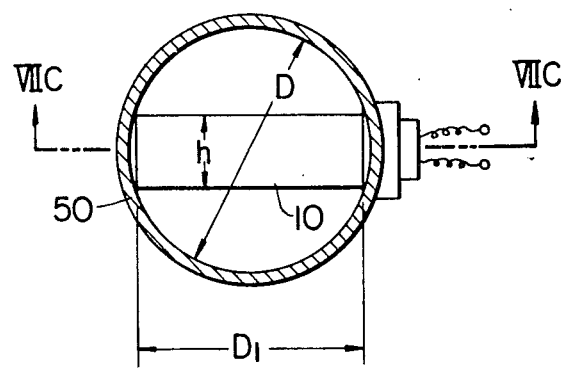
Figure 7C:
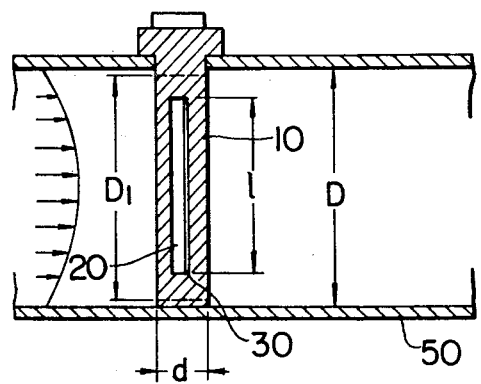

FIGS. 7A, 7B and 7C illustrate an apparatus whose vortex generating element 10 is constructed in such manner as to satisfy all the foregoing conditions.

As shown in FIGS. 7A, 7B and 7C, vortex generating element 10 is formed with a rectangular cross-section, and the depth to height ratio $d/h$ is set to a value 2/3 (=0.67). A transverse bore 20 is provided inside said vortex generating element 10 so as to communicate therethrough to the two opposed surfaces of the element 10 which align with the flowing fluid. A fluid displacement detecting means 30 comprising, for example, a thermistor or a platinum resistance wire, is arranged within the transverse bore 20 and numeral 50 indicates a pipe in which the vortex generating element 10 is installed. The two openings of the transverse bore 20 which are provided on opposite sides of the vortex generating element 10 are shaped as elongate slots in this embodiment. The ratio of $A/Ao$ is set to a value of 0.33 to satisfy one of the above mentioned conditions, as $A = e \cdot l$ and $Ao = D_1 \cdot d$, where $e$ is the length of the transverse bore 20 in the axial direction of the pipe 50, $l$ is the length of the transverse bore 20 in the axial direction of the vortex generating element 10, $D_1$ is the length of the surface of the vortex generating element 10 in the axial direction of the same element; and $d$ is the depth of the element 10 in the axial direction of the pipe 50.

Moreover, the ratios of $l/D$ and $h/D$ are also set to 0.77 and 0.28 respectively.

In a flow velocity measuring apparatus constructed to satisfy the above conditions, the flow around the vortex generating element is strongly accelerated and an immediate coiling-up of the flow takes place: that is, the flow energy is converted efficiently into energy generating a vortex. The fluid within the transverse bore 20 is displaced through the openings in an alternating fashion, first in one direction and then a reversed direction, powerfully and efficiently. The openings control the generation and the shedding of Karman's vortices and serve to produce more powerful and stable vortices, thereby improving linearity. As powerful and stable vortices are produced and shed by the element 10, corresponding displacements of the fluid within the transverse bore 20 also take place powerfully and stably, and the frequency of those displacements of the fluid is reliably detected by detecting means 30.

FIGS. 8A, 8B through 13A, 13B illustrate other embodiments of the invention, each of which is constructed so as to satisfy the dimensional conditions listed above.

Figure 8A:
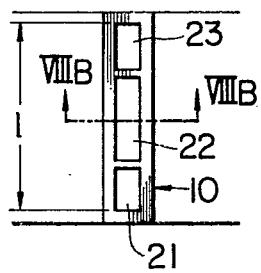
Figure 8B:
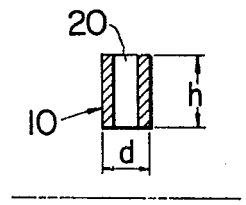

In the embodiment shown in FIGS. 8A and 8B, the vortex generating element 10 has three elongate slit-shaped transverse bores 21, 22 and 23 having their longer sides extending in the axial direction of said element 10, and being arranged end-to-end in an axial row.

Figure 9A:
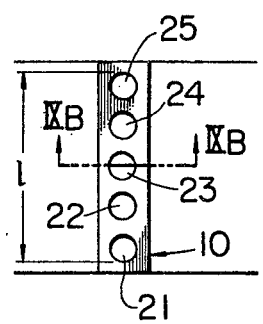
Figure 9B:
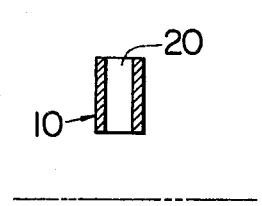

In another embodiment shown in FIGS. 9A and 9B, circular transverse bores 21 through 25 are arranged in a row in the axial direction of the vortex generating element 10.

Figure 10A:
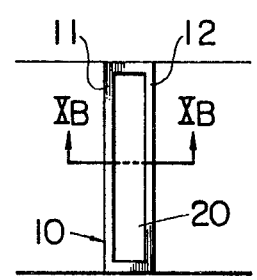
Figure 10B:
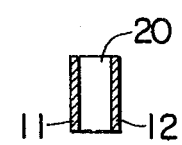

In still another embodiment shown in FIGS. 10A and 10B, the vortex generating element 10 comprises two flat plates 11, 12 extending across the direction of fluid flow, and the space between said plates serves as a transverse bore or passageway.

Figure 11A:
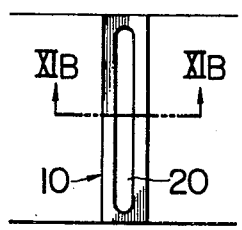
Figure 11B:
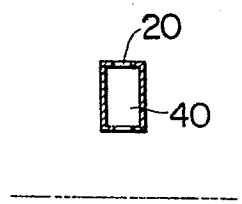

In another embodiment shown in FIGS. 11A and 11B, the shape of the opening of the transverse bore 20 is that of an elongate "O" extending in the axial direction of the vortex generating element 10, and a cavity is provided inside the vortex generating element 10 to communicate with the transverse bore 20.

Figure 12A:
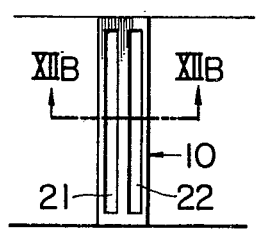
Figure 12B:
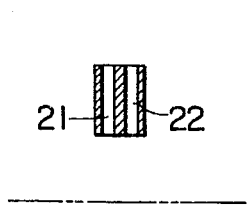

In the embodiment shown in FIGS. 12A and 12B, the transverse passageway is formed by elongate slits 21 and 22 extending parallel with one another in the axial direction of the vortex generating element 10, and arranged side-by-side.

Figure 13A:
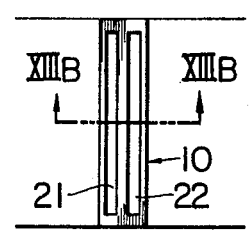
Figure 13B:
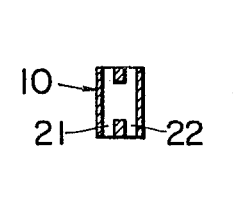

In another embodiment shown in FIGs. 13A and 13B, the transverse passageway is formed by two transverse bores 21, 22 communicating with each other within the interior of vortex generating element 10.

In the above embodiments, a fluid-displacement detecting means is employed as a detector of the number of vortices generated and is shown arranged within the transverse bore 20. The detecting means, however, may be arranged at the downstream side of the vortex generating element 10 so as to detect vortices themselves which are shed downstream. Furthermore, detecting means using ultrasonic signals may be employed as a detector, making use of modulation of the ultrasonic signal which is caused by a vortex or a displacement of fluid.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

It is claimed:

1. Flow metering apparatus of the type having a vortex generation element with a generally elongate shape placed transversely in a stream of fluid to produce on opposite sides of the element vortices which are shed in alternating fashion, and having means for measuring the frequency of vortex production to determine the velocity of the fluid stream, the flow metering apparatus being characterized in that:

the vortex generation element is formed with a rectangular cross-section with a depth $d$ along the direction of fluid flow and a height $h$ across the direction of fluid flow which are in a ratio $d/h$ lying between about 0.5 and 0.9;

the vortex generation element comprises passageway means extending through the element between the two opposed rectangle sides aligned with the direction of fluid flow for communicating fluid fluctuation therebetween; and the passageway means forms an opening of area $A$ in the element surface which is related to the area $Ao$ of the element rectangle side containing the opening with a ratio $A/Ao$ between about 0.3 and 1.0;

whereby vortices are stably and powerfully generated and the Strouhal number remains constant over a wide range of Reynolds numbers.

2. Flow metering apparatus as claimed in claim 1 wherein the vortex generating element is mounted transversely in a pipe having an inside diameter $D$, and containing the stream of fluid; wherein the passageway means forms an opening in the element surface with a length $l$ measured along the axis of the vortex generation element; and wherein the length $l$ and pipe diameter $D$ have a ratio $l/D$ of between about 0.5 and 1.0.

3. Flow metering apparatus as claimed in claim 1 wherein the passageway means forms openings on the surface of the vortex generation element, and wherein the openings comprise elongate slits extending in the axial direction of the vortex generating element.

4. Flow metering apparatus as claimed in claim 3 wherein said elongate slits are arranged end-to-end in a row.

5. Flow metering apparatus as claimed in claim 1 wherein the passageway means forms openings in the surface of the vortex generation element, and wherein said openings are in the form of a row of circular holes extending in the axial direction of the vortex generation element.

6. Flow metering apparatus as claimed in claim 1 wherein the vortex generation element comprises two parallel plates extending along the direction of flow, the space between the plates forming said passageway means.

7. Flow metering apparatus as claimed in claim 1 wherein said passageway means comprises means forming a cavity within the vortex generation element, and openings between the cavity means and the surface of the vortex generating element.

8. Flow metering apparatus as claimed in claim 1 wherein the passageway means forms openings in the surface of the vortex generation element, and wherein the openings comprise elongate side-by-side slits parallel to one another and extending in the axial direction of the vortex generation element.

9. Flow metering apparatus of the type having a vortex generation element with a generally elongate shape placed transversely in a stream of fluid in a pipe to produce on opposite sides of the element vortices which are shed in alternating fashion, and having means for measuring the frequency of vortex production to determine the velocity of the fluid stream in the pipe, the flow metering apparatus being characterized in that:

the vortex generation element is formed with a rectangular cross-section with a depth $d$ along the direction of fluid flow and a height $h$ across the direction of fluid flow in a range of $0.5 \leq d/h \leq 0.9$;

passageway means extend through the element between the two opposed rectangle surfaces aligned with the direction of fluid flow to communicate fluid fluctuations therebetween;

the passageway means form openings in the opposed rectangle surfaces of the vortex generation element, the ratio of the area $A$ of an opening to the area $Ao$ of the element surface containing the opening being $0.3 \leq A/Ao < 1$;

the length $l$ of the opening of the passageway means, measured in the axial direction of the vortex generation element, having a ratio to the inside diameter $D$ of the pipe in the range $0.5 \leq l/D < 1$; and the ratio of the height $h$ of the vortex generating element to the inside diameter $D$ of the pipe is within the range of $0.2 \leq h/D \leq 0.35$.

* * * * *